Figure 1:
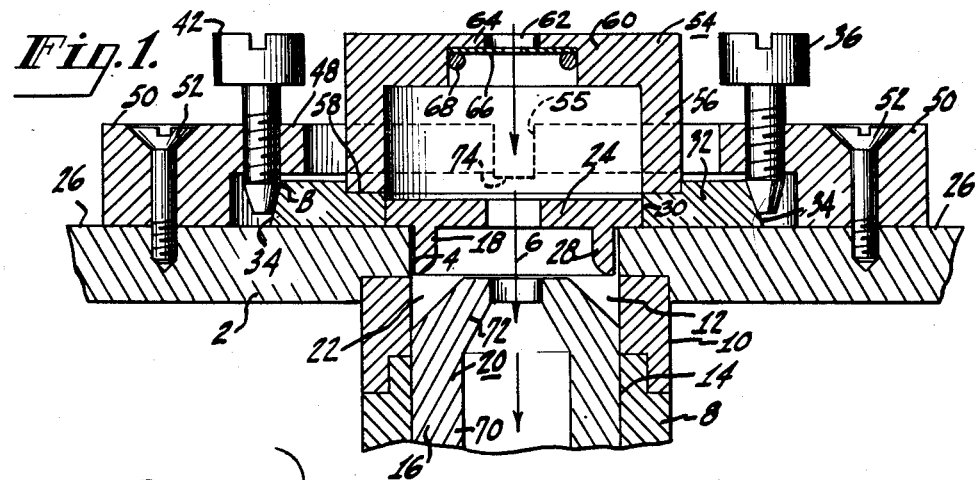

May 18, 1954  J. H. REISNER ET AL  2,679,018
MAGNETIC ELECTRON LENS POLE PIECE
Filed June 30, 1950  2 Sheets-Sheet 2

INVENTORS
JOHN H. REISNER &
PERRY C. SMITH
BY
ATTORNEY

Patented May 18, 1954

2,679,018

UNITED STATES PATENT OFFICE 2,679,018

MAGNETIC ELECTRON LENS POLE PIECE

John H. Reisner, Haddonfield, and Perry C. Smith, Moorestown, N. J., assignors to Radio Corporation of America, a corporation of Delaware Application June 30, 1950, Serial No. 171,456

7 Claims. (Cl. 313—84)

This invention relates to electron optical systems, and, more particularly, to improvements in transversely adjustable elements of a pole piece of a magnetic electron lens.

When an electron optical system is assembled, various adjustments are usually necessary to place it in proper operating condition. For example, the optical axes of the lenses must be aligned with each other and with the axis of the electron beam emerging from the electron source. It is important that all of the elements of the electron optical system be substantially in alignment with the optical axis of the objective lens in order to keep lens aberrations to a minimum. This is particularly true of elements preceding the objective lens in the electron path.

The alignment of electron axes may include making necessary adjustments of the angle of inclination of the axes or of transverse displacement of the axes. Since the latter type of adjustment is usually easier to make, it is desirable to reduce as many as possible of the adjustments to those involving transverse movements of elements.

Besides the alignment of the optical axes of all the optical elements in an electron optical system, it is also often necessary to correct a lens pole piece for other lens defects such as astigmatism. Astigmatism, in an electron lens, as in an ordinary light optical system lens, is that defect which causes the lens to have different focal lengths in planes normal to each other. If one views an image brought to a focus by an astigmatic lens, some peripheral sectors may be in perfect focus while others will be blurred or hazy. More generally, in an astigmatic lens, an off-axis point in the object is imaged as two mutually perpendicular lines in different focal planes.

There are several types of imperfections which may give rise to astigmatism in an electron lens. First of all, astigmatism may result from transverse displacement of otherwise perfect pole piece elements. In this case, it is obvious that an adjustment to permit transverse correction of the elements to eliminate the displacement is the cure. On the other hand, astigmatism may be due to causes other than transverse displacement. For example, the defect may be caused by non-uniform material, inclined grain direction in the magnetic material out of which the lens is made, out-of-round holes through the lens elements, non-parallel surfaces of elements making up the pole pieces, or non-uniform energization of lens elements. It has unexpectedly been found possible to correct for astigmatic lens defects due to non-uniform material, etc., by effecting small transverse displacements of either one or both pole piece elements with respect to the other and to the lens spool with which they are assembled.

A principal object of the invention is to provide an improved means for correcting a magnetic electron lens for astigmatism.

Another object of the invention is to provide an improved method of correcting a magnetic electron lens for astigmatism.

Another object of the invention is to provide an improved pole piece for a magnetic electron lens.

Another object of the invention is to provide an improved magnetic electron lens pole piece having transversely adjustable elements.

Another object of the invention is to provide an improved means for effecting transverse adjustments of the elements of a pole piece of a magnetic electron lens.

A further object of the invention is to provide an improved means for transversely aligning an element of a permanent magnet electron lens.

A still further object of the invention is to provide an improved means for making final transverse alignment changes in an element of a magnetic lens pole piece after the pole piece has been assembled on a lens spool.

Another object of the invention is to provide an improved means for making minor transverse adjustments of an element of a magnetic lens pole piece with respect to a lens spool.

Still another object of the invention is to provide means for imparting transverse motion simultaneously to both condenser aperture and a pole piece element of a magnetic electron lens.

Figure 2:
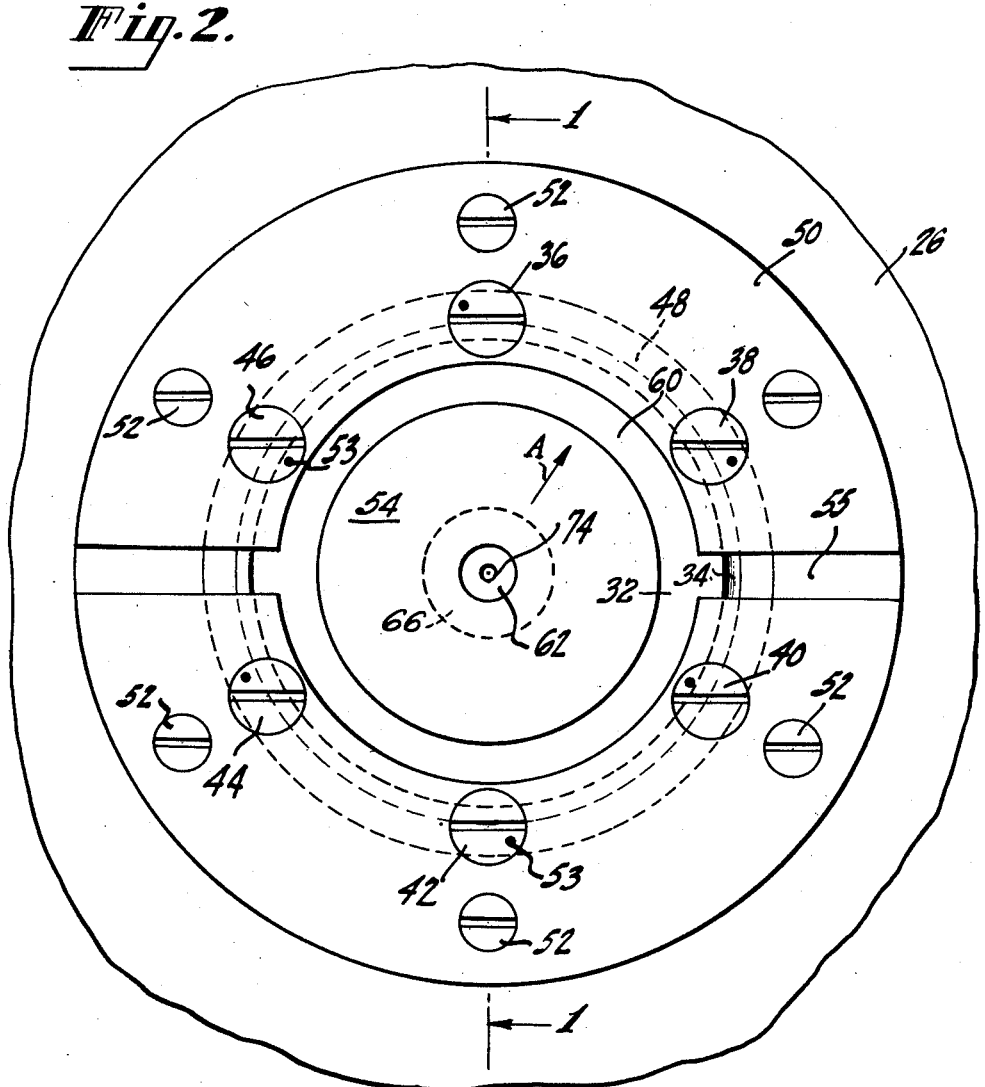
Figure 7:
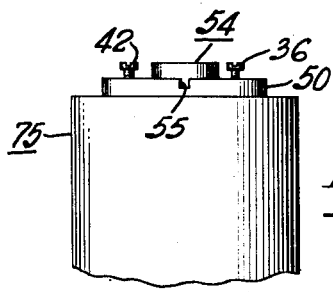

These and other objects will be more apparent and the invention will be more readily understood from the following detail description, including the drawings, of which:

Figure 1 is a longitudinal cross section view taken through the electron optical axis of an end of a lens spool, along the line 1—1 of Figure 2, including a pair of objective lens pole piece elements, a condenser lens aperture assembly, and means in accordance with the present invention for transversely aligning one of the pole piece elements, Figure 2 is a plan view of the apparatus of Figure 1, Figure 3 is a cross section view taken through the electron optical axis of a pair of pole piece elements of a magnetic electron lens assumed to have exhibited astigmatic properties of long and short focal length in planes normal to each other, Figure 4 is a cross section view of the pole piece elements of Figure 3 with a diagram showing how transverse displacement of one pole piece element can be used to correct for differences in focal lengths of an electron lens pole piece, taken in planes normal to each other, Figure 5 is a longitudinal cross section view through an end of a lens spool similar to that of Figure 1 and showing a second embodiment of means in accordance with the present invention for effecting transverse adjustment of pole piece elements, Figure 6 is a longitudinal cross section view of a somewhat different type of entrance pole piece element which may be substituted for the corresponding part shown in Figure 5 when a short air gap is desired, and Figure 7 is a fragmentary elevational view of the apparatus of Fig. 1 shown in place on a lens spool.

One aspect of the present invention comprises improved pole pieces for a magnetic electron lens, having transversely adjustable pole piece elements. Also included are means for effecting transverse displacement of the pole piece elements. At the same time, the condenser aperture may also be moved transversely. Another aspect of the invention is the introduction of a new method of correcting a magnetic electron lens for astigmatism by effecting transverse displacement of one or more elements of an electron lens.

Specific embodiments of the invention will now be described but these are intended to be merely illustrative of many equivalent forms of apparatus which could be used.

An electron microscope having permanent magnet lenses may be constructed so as to include a lens spool of the type more particularly shown and described in co-pending application, Serial No. 94,556, of John H. Reisner, filed May 21, 1949, now U. S. Patent No. 2,579,273. This lens spool comprises a magnetic structure including a plurality of bar magnets arranged to energize air gaps disposed adjacent opposite ends of the spool. The spool also includes end plates of magnetically permeable material, such as soft iron, against each of which some of the magnets abut.

Referring now to Figure 1, there is shown in section the central portion 2 of a lens spool end plate such as more completely described in the above referred to co-pending application. This plate is provided with an opening 4 to permit passage of a beam of electrons having a longitudinal axis 6. The end plates are spaced apart by means of a core member of magnetically permeable material, one end of which, 8, is shown provided with a non-magnetic spacer 10 which separates the core member from the end plate 2. Both the spacer and the core member are provided with central passages 12 and 14, respectively, which are in alignment with the opening 4 in the end plate.

In order to focus a beam of electrons properly, using a magnetic field of suitable configuration, a pole piece 16 of magnetically permeable material is provided adjacent the end of the lens spool. This pole piece includes an entrance element 18 and an exit element 20. These two elements may serve, for example, as object element and projector element of the lens. Between the elements is an air gap 22 energized by magnets (not shown) assembled on the lens spool.

In accordance with one embodiment of the present invention, the entrance element 18 comprises an annular disc-shaped portion 24 having an under surface machined to rest on the outer face 26 of the lens spool end plate. Extending downwardly from the under surface of the disc-shaped portion of the entrance element is a circular lip member 28 integrally joined thereto. The lip member extends into the opening through the end plate but the diameter of the lip is made somewhat smaller than the diameter of the opening to permit limited transverse movement of the entrance element with respect to the end plate of the spool. The outer periphery 30 of the disc-shaped portion 24 of the entrance element is machined to fit tightly within a collar 32, the collar also being an annular shaped member having an under surface machined to rest slidably on the outer face of the end plate 2.

Referring particularly to Figure 2, transverse movement of the entrance element is effected by imparting controlled motion to the collar. The outer periphery 34 of the collar is bevelled inwardly. At least three adjusting set screws and, in the embodiment illustrated, six screws, 36, 38, 40, 42, 44, and 46, each having a tapered end, are set preferably at an equiangular distribution around the collar and mounted so that the tapered ends can be brought to bear against the bevelled periphery of the collar. The adjusting screws are threaded through an overhanging flange 48 of a clamping ring 50 which is fixedly secured to the end plate by means of screws 52. The adjusting screws extend through the flange with the tapered ends emerging below. The tapered ends of the screws normally bear tightly against the bevelled periphery of the entrance element collar. The heads of each of the adjusting screws is preferably provided with a dot 53, or other indicating reference means, in order to enable the user to determine the angle through which each screw has been turned.

If it is desired to move the entrance element transversely in a certain angular direction, the set screws closest to the angle of desired movement are loosened somewhat and the other set screws are tightened a corresponding amount. This causes the entrance element and the collar to slide a short distance over the end plate 2. Movement of the entrance element is limited, however, by the clearance left between the lip member 28 and the walls of the opening through the end plate of the lens spool. In the example illustrated, the difference between the outer diameter of the lip and the inner diameter of the opening was 3/1000 inch. Referring more particularly to Figures 1 and 2, suppose it is desired to move the entrance element in a direction indicated by the arrow A. Screws 36, 38, 40, and 46 are loosened and screws 42 and 44 are tightened, thus resulting in moving the entrance element to a different position. Screws 40 and 46 would also then be tightened to help lock the element in its final position. As shown, particularly in Figure 2, the upper portion of the clamping ring 50 and the flange 48 are provided with a transverse slot 55. This slot does not extend entirely through the clamping ring vertically and is for the purpose of permitting insertion of a specimen holder.

If the electron optical system includes a condenser aperture positioned between the electron gun and the objective lens, it is desirable to maintain perfect alignment always between the center of the aperture and the optical axis of the lens.

An additional feature of the present invention is the inclusion of means for maintaining this alignment regardless of transverse adjustments made on the entrance element of the objective lens pole piece. Referring again to Figure 1, a condenser aperture holder 54 is provided with a cylindrical base portion 56 positioned concentrically with respect to the entrance element. The bottom surface of the base portion fits within a channel 58 machined into the upper surface of entrance element collar 32. Across the top of the cylindrical base portion of the condenser aperture holder, a laterally extending roof member 60 is provided. The roof member has a central opening 62 behind which, in a channeled portion 64, the condenser aperture plate 66 is held by means of a retaining ring 68.

As previously stated, the objective lens pole piece also includes an exit element 20, which may comprise a cylindrical barrel portion 70 of magnetically permeable material fitting tightly within the central bore of the lens spool, and a tapered end portion 72 of the same material, shaping the air gap of the lens.

In use, electrons from a suitable source (not shown) are focused into a beam and directed through the opening in condenser aperture member 66. The electron beam has a longitudinal axis 6. In the course of their passage, the electrons pass through a specimen 74 and are formed into a magnified image by lens pole piece elements 18 and 20, which image is projected onto a luminescent target or photographic film plate (not shown). The relationship of the assembly shown in Figs. 1 and 2 with respect to a lens spool 75 of the type described and claimed in the aforesaid copending application is illulstrated in Figure 7.

A brief explanation of how transverse adjustment of pole piece elements can be utilized to correct astigmatism in an electron lens will now be given. Figure 3 shows an entrance element 76 and an exit element 78 of a lens pole piece in perfect alignment so far as relative physical position goes. Let it be assumed, however, that, due to any one of the defects previously listed, such as inclination of grain in the steel, etc., the lens has different focal lengths in planes normal to each other. The circle 80 is a cross section taken perpendicularly to the electron optical axis 82 through the lens. Let the circle have a diameter $d$ and let it be assumed that the lens has a longer focal length in a plane which includes the line A—A' than it has in a plane which includes the line B—B'. Figure 4 shows that a transverse displacement of either the entrance element 76 or the exit element 78 relative to the other by a distance $\Delta d$ may be utilized to shorten the width of the circular figure along the line A—A' to a distance equal to $d - 2\Delta d$ while leaving the width along B—B' unchanged. This may result in adjusting the focal lengths taken in all planes through the lens pole piece so that they are more nearly equal.

Another modification of apparatus which may be constructed in accordance with the present invention is illustrated in Figure 5. The apparatus shown in Figure 5 comprises essentially the same electron lens parts previously described in connection with Figures 1 and 2. The apparatus again includes a lens spool of which a part of the end plate 84 is shown. The spool also includes a core member, of which one end, 86, is shown, and a non-magnetic spacer 88 separating the end of the core member from the end plate.

The pole piece elements again comprise an entrance element 90 and an exit element 92. However, in the present modification, the two elements are joined by a cylindrical linking member 94 of nonmagnetic material, so that both together may be inserted or removed for adjustment or cleaning from the barrel of the instrument. At least three adjusting set screws 96 are set equi-angularly around the outer periphery of entrance element 90 and three more adjusting screws 98 are provided around the outer periphery of the upper portion of exit element 92.

The entrance element comprises an annular disc shaped portion having an under surface resting on the outer surface of the end plate 84 for slidable movement thereover. The entrance element also has a downwardly extending lip portion 100 of circular form which has, in its outer wall, a channeled groove 102 adapted to receive the ends of adjusting screws 96. The adjusting screws are positioned equi-angularly around the periphery of the lip and by loosening some screws and tightening others the entrance element can be made to move in any direction transverse to the optical axis of the element. Adjustment can, of course, not be made without lifting the pole piece assembly out of the barrel of the instrument, in this form of the invention.

The exit element 92 of the pole piece comprises a cylindrical member 104 which fits snugly within the bore of the core member 86, and a separately movable tapered end member 106 having an under surface machined to slide over the end surface of the cylindrical member. Transverse adjustment is made by turning the adjusting screws 98 which bear against a groove 108 channeled in the outer periphery of the tapered member. The grooves 102 and 108 also prevent vertical displacement of one pole piece element with respect to the other.

With the adjusting means of the present invention, pole piece elements of almost any desired configuration may be used. In Figure 6, there is shown another form of entrance element 110 which may be used when a very short air gap is desired. The groove 112 is adapted to accommodate adjusting screws such as illustrated in Figure 5.

The apparatus which has been described permits the elements of a magnetic lens pole piece to be assembled on a lens spool substantially in their final alignment positions. The elements can then be given any small final transverse displacements found necessary to correct for lens defects such as astigmatism. The invention is distinguished, in its method aspects, from merely effecting perfect physical alignment of entrance and exit elements of a pole piece in order to correct for mis-alignment of perfect elements. In the present invention, imperfect pole piece elements may be corrected for astigmatic defects by transverse displacements which will usually result in something other than perfect physical alignment. In its apparatus aspects, the invention is novel in that it provides means for effecting small transverse displacements of pole piece elements after they have been assembled on a lens spool. These displacements may be described as being within a radius of a small circle in a plane substantially transverse to the longitudinal axes of the pole piece elements, in the preferred embodiments illustrated, but are obviously not limited to an area of movement having any particular dimensions or configuration.

We claim as our invention:

1. In an electron optical apparatus including a magnetic lens pole piece having an entrance element and an exit element, means for aligning said elements including adjusting screw means for moving said entrance element and said exit element with respect to each other, each within a radius of a small circle in a plane substantially transverse to the longitudinal axes of said elements.

2. In an electron optical apparatus including a lens mounting spool, an entrance element of a magnetic lens pole piece mounted on an end of said spool, and an exit element of said lens pole piece mounted within said spool, means for moving said entrance pole piece transversely with respect to its optic axis, comprising a collar for holding said entrance pole piece, said collar being mounted for slidable movement over said spool end, means for moving said collar within a radius of a small circle in a plane transverse to said axis, and means for locking said collar in any selected position.

3. In an electron optical apparatus, a lens spool, a magnetic lens pole piece assembly mounted on said spool, said pole piece assembly including a pair of pole piece elements spaced to provide an air gap, and means for effecting transverse displacements of at least one of said elements with respect to the longitudinal axis of said spool.

4. In an electron optical apparatus, a lens spool, a magnetic lens pole piece assembly mounted on said spool, said pole piece assembly including a pair of pole piece elements, and means for effecting limited transverse displacements of each of said elements, independently of the other, with respect to the longitudinal axis of said spool.

5. In an electron optical system including a condenser aperture plate and a magnetic lens pole piece including an entrance element and an exit element, means for simultaneously effecting transverse displacements of said condenser aperture plate and said entrance pole piece with respect to the longitudinal axis of said exit pole piece.

6. In an electron optical system including a lens spool adapted to be fixedly mounted on a support, a pair of pole piece elements, and adjusting means whereby at least one of said elements is adapted to be moved transversely, in any desired angular direction, with respect to the longitudinal axis of said spool.

7. In an electron optical system including a lens support spool, a pole piece mounted on said spool, said pole piece comprising a pair of pole piece elements, and adjusting means whereby said elements are adapted to be moved transversely with respect to each other in any desired direction.

References Cited in the file of this patent

UNITED STATES PATENTS

| Number | Name | Date |
|---|---|---|
| 2,243,403 | Von Ardenne | May 27, 1941 |
| 2,268,539 | Von Borries et al. | Dec. 30, 1941 |
| 2,510,349 | Reisner | June 6, 1950 |
| 2,533,688 | Quam | Dec. 12, 1950 |